United States Patent [19]
Bigler et al.

[11] 3,748,742
[45] July 31, 1973

[54] CUTLERY TOOL

[76] Inventors: David A. Bigler, 4603 Belmour Way;
Boyd R. Bigler, 1791 Oakridge Dr.,
both of Salt Lake City, Utah 84117;
Owen G. Bigler, 1321 Creek Rd.,
Sandy, Utah 84070

[22] Filed: Sept. 16, 1971

[21] Appl. No.: 180,989

[52] U.S. Cl............................................ 30/294, 7/1 H
[51] Int. Cl............................................. B26b 29/00
[58] Field of Search..................... 30/286, 287, 294,
30/312, 313, 314, 339, 340; 128/305; 17/1 R,
17; 145/61 R, 108 R, 108 A, 108 B

[56] References Cited
UNITED STATES PATENTS
327,776   10/1885   Eisenhardt.................... 145/108 B
2,198,814   4/1940   Hart................................. 30/286
3,241,236   3/1966   Capps............................... 30/294

FOREIGN PATENTS OR APPLICATIONS
99,274   7/1940   Sweden........................... 145/108 R Primary Examiner—Othell M. Simpson
Assistant Examiner—Mark S. Bicks
Attorney—Ross H. Workman

[57] ABSTRACT

A cutlery tool having a rigid body and a centrally disposed handhold therein. A sharpened blade is situated so as to have an exposed cutting surface at the leading or front edge of the tool. In one preferred embodiment a forwardly tapered tongue is integral with the tool adjacent the bottom edge thereof beneath the blade. In another presently preferred embodiment a rearwardly projecting tapered member is integral with the body. If desired, a secondary handle can be formed in vertically stacked relation above the body.

6 Claims, 6 Drawing Figures

PATENTED JUL 31 1973  3,748,742

INVENTORS.
DAVID A. BIGLER
BOYD R. BIGLER
OWEN G. BIGLER

BY H. Ross Workman
ATTORNEY

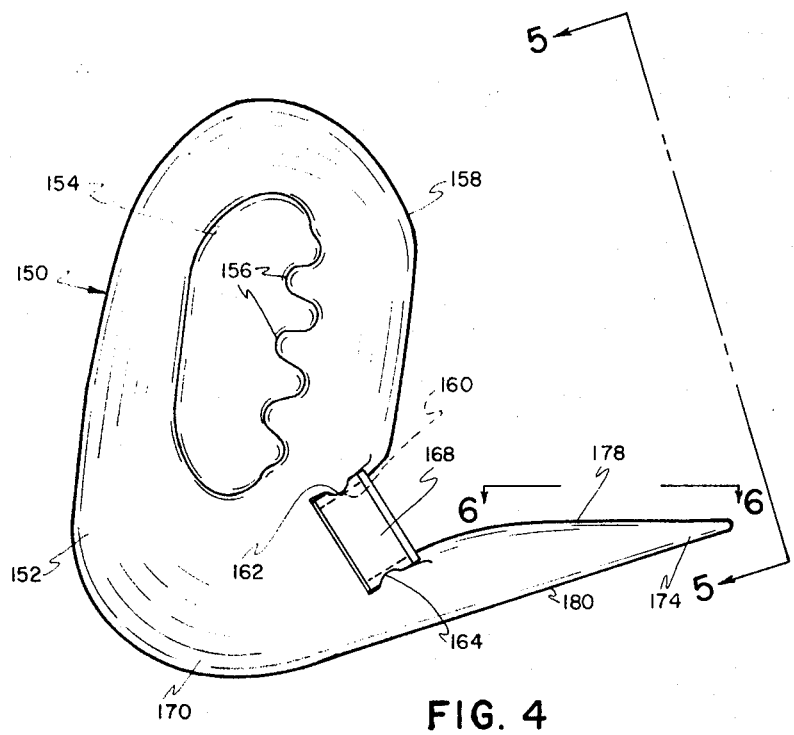
FIG. 4
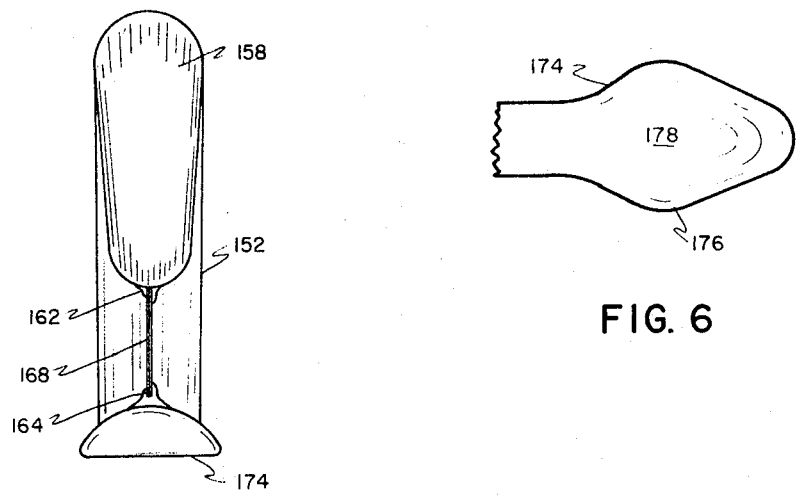
FIG. 5
FIG. 6
INVENTORS.
DAVID A. BIGLER
BOYD R. BIGLER
OWEN G. BIGLER
BY H. Ross Hoskins
ATTORNEY

CUTLERY TOOL

BACKGROUND

1. Field of the Invention

The present invention relates to cutlery tools and more particularly to a novel tool for removing entrails from animals and fish.

2. The Prior Art

It is well-known that disemboweling or gutting carcasses of animals in the slaughtering and meat packing industry presents special problems. Historically, it has been necessary to exert special care to prevent severing of the entrails during the disemboweling operation so that they might be preserved for future use. In the sporting field, it is particularly important to preserve the carcass by removing the entrails to facilitate cooling of the carcass. In addition, if the entrails are severed during the removal operation, the quality of the animal meat can be adversely affected. The problem of removing entrails without cutting and mutilation normally requires tools other than a knife and a certain amount of disagreeable hand removal of entrails is required.

A number of tools have been used to minimize the likelihood that the entrails will be mutilated during disemboweling operations. For example, see U. S. Pat. No. 3,445,931. Nevertheless, until this present invention a safe, inexpensive and easily used cutlery tool has not been available.

BRIEF SUMMARY AND OBJECTS OF THE INVENTION

The present invention comprises a lightweight essentially rigid cutlery tool for disemboweling and gutting animals and fish without mutilating the entrails and/or requiring substantial hand removal of entrails.

It is, therefore, a primary object of the present invention to provide a novel cutlery tool.

It is another primary object of the present invention to provide a tool accommodating disemboweling of animals more quickly and easily than heretofore possible.

One still further object of the present invention is to provide an improved fish-cleaning tool.

These and other objects and features of the present invention will become more fully apparent from the following description and appended claims taken in conjunction with the accompanying drawings.

BRIEF DESCRIPTION OF THE DRAWINGS

FIG. 4 is a side elevation of still another presently preferred cutting tool embodiment;

FIG. 5 is an end elevation view along line 5—5 of FIG. 4; and

FIG. 6 is a fragmentary plan view along line 6—6 of FIG. 4.

DETAILED DESCRIPTION OF THE PREFERRED EMBODIMENTS

Figure 2:
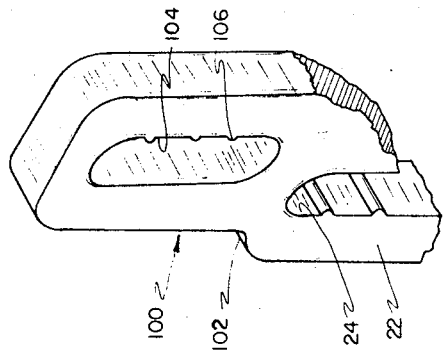
FIG. 2 is a fragmentary perspective illustration of a handle construction which may be used with the embodiments of FIG. 1.
Figure 1:
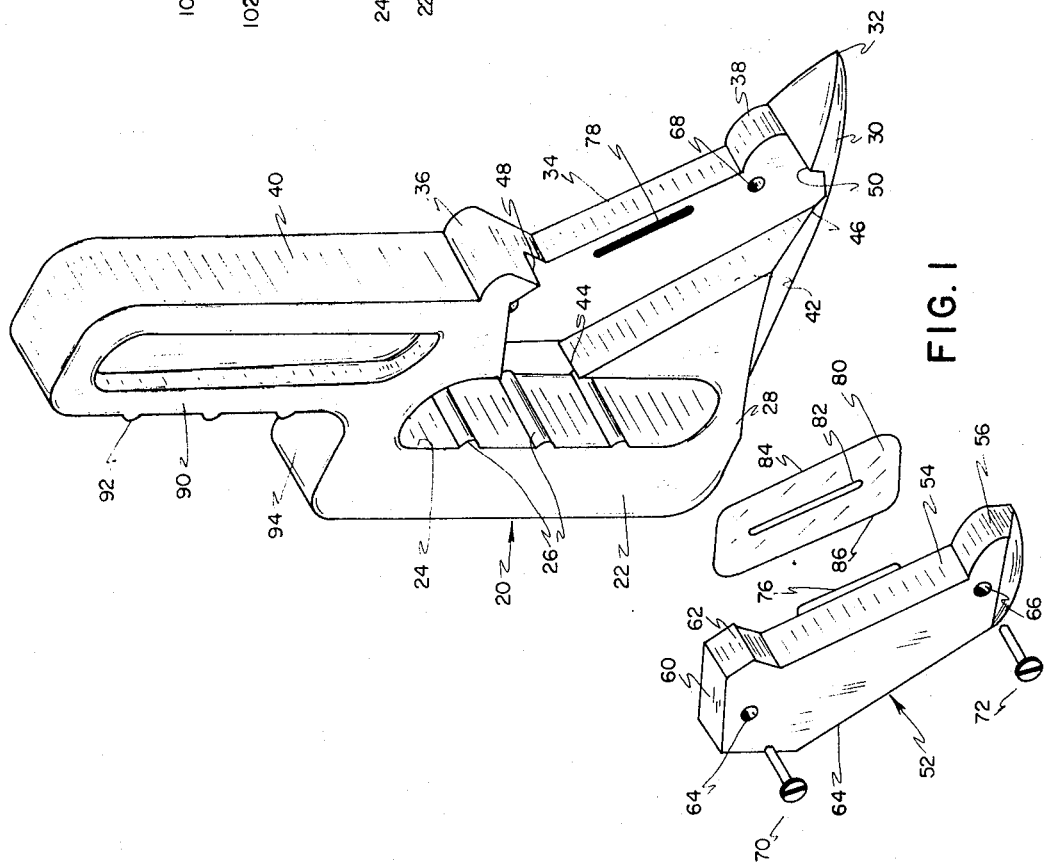
FIG. 1 is an exploded perspective illustration of one presently preferred embodiment of the invention.

The Embodiment of FIGS. 1-2

Reference is now made particularly to FIG. 1 which illustrates a cutlery tool generally designated 20 having a body portion 22. The tool is preferably formed of a suitable synthetic resinous material and may be easily formed in an injection mold. Nevertheless, any suitable rigid structural material, including metal, could be used. A contoured elongated aperture 24 is formed in the body 22 to serve as a handhold. The handhold 24 is essentially centrally located in the body 22 and has, when desired, a plurality of ribs 26 which accommodate improved finger gripping of the body 22. The lower end 28 of the body 22 is continuous with a forwardly projecting tongue 30. Preferably, tongue 30 is disposed essentially at right angles with respect to the handhold 24. Tongue 30 is tapered forwardly and terminates in a sharpened point 32 for the purpose hereinafter to be more fully described.

The body 22 has a sloping front edge 34 which is situated between forwardly protruding members 36 and 38. Forwardly protruding member 38 terminates intermediate the length of tongue 30 and protruding member 36 terminates intermediate the vertical leading edge 40 of the body 22.

A recess 42 is situated essentially parallel to the angle formed by leading edge 34 so as to extend from the handhold at 44 to an intermediate portion of the tongue 30 at 46. The recess also opens along the entire length of leading edge 34 and projecting member 38. The projecting member 36 forms a shoulder 48 which defines the upper limit of recess 42. The lower limit of recess 42 is defined by the trailing edge 50 of the tongue 30.

An insert generally designated 52 is contoured so as to correspond to the shape of recess 42. Insert 52 has a leading edge 54 adapted to be substantially parallel to the leading edge 34 when the insertion 52 is in the assembled position. Leading edge 54 has a forwardly projecting member 56 which, when the insert is assembled upon the body 22, will be parallel to the member 38.

The insert 52 has an essentially flat upper surface 60 and a contiguous angularly related surface 62. In the assembled relation, the surface 62 abuts the shoulder 48 and cooperates with the trailing edge 64 of the insert 52 to minimize the tendency for lateral play or movement of the insert 52 when assembled into the body 22.

Insert 52 has spaced bores 64 and 66 which, when the insert 52 is assembled into the body 22, are in alignment with corresponding bores 68 in recess 42. Fastening structures such as screws 70 and 72 are used to anchor the insert 52 into the recess 42. Preferably, the insert 52 has an outwardly projecting rib 76 disposed essentially parallel to the leading edge 54. Rib 76 is adapted to be received by elongated slot 78 formed in the recess 42. It is presently preferred that a sharpened blade 80 be provided with a slot 82 which is essentially the same size as slot 78 and which will accommodate the rib 76 in male-female relation.

Thus, when the blade 80 is placed upon the rib 76 and when the insert 52 is anchored in the recess 42, the cutting edge 84 of the blade 80 will be exposed a substantial distance beyond the leading edges 34 and 54. The rib 76 onto which the cutting blade 80 is situated will prevent lateral and rotational movement of the blade relative to the body 22. If desired, blade 80 may have another sharpened edge 86 so that the blade 80 may be simply rotated to expose the edge 86 when a fresh sharpened edge is desired. Moreover, the ease with which disassembly of the tool 20 can be obtained makes rapid replacement of blade 80 possible.

In the illustrated embodiment, it is presently preferred to provide a secondary handle 90 integral with the body 22 and having a leading edge common with the edge 40. The secondary handle 90, in the illustrated embodiment, is substantially solid and formed as a one-piece structure from the same resinous material forming body 22. If desired, ribs 92 may be placed on the handle 90 to improve the grip on the handle. It should also be observed that the secondary handle 90 is offset with regard to the body 22 so as to expose a shelf 94.

If desired, the embodiment of FIG. 1 may be modified to include a secondary handle generally designated 100. Secondary handle 100 is similar to the secondary handle 90 except that it has a greater transverse dimension so that shelf 102 is substantially smaller than shelf 94. In addition, the handle 100 has a secondary handhold 104 formed therein. If desired, handhold 104 may have ribs 106 projecting therein, ribs 106 being substantially the same as ribs 26 (FIG. 1) and serving the same function.

In the use of the cutlery tool 20, an animal carcass may be hung by the rear legs, as is conventional, and a small opening made with a knife in the abdomen of the carcass. Thereafter, the leading point 32 of the tongue 30 is inserted into the opening so that the tongue 30 is located flat against the interior surface of the hide and the edge 84 of the blade 80 is situated directly against the hide. Because of the arrangement of handhold 24 and secondary handle 90, the cutlery tool 20 can be easily drawn or pushed along the entire length of the abdomen for disemboweling the animal. The cutting blade is situated at an angle with respect to the cutting direction so that cutting will occur more easily and effectively. The tongue 30, during the cutting step remains against the interior surface of the hide and is configured so as to prevent penetration of the membrane containing the entrails. The cutting blade 80 is shielded from the entrails by the tongue 36 so that the entrails are not inadvertently cut with the animal hide.

Thereafter, a small opening can be made with a knife in the membrane containing the entrails. The membrane can then be opened by inserting the tongue 30 in the opening and drawing or pushing the blade along the length of the membrane. This frees the entrails without mutilation.

When the entrails are removed, a cut is made from the abdominal opening to the hock of each rear leg and the knee of each front leg. The tongue 30 prevents inadvertent mutilation of the usable meat.

If preservation of the hide in one piece is not important, the blade 80 can be drawn or pushed the length of the back so as to divide the back longitudinally in thirds.

Figure 3:
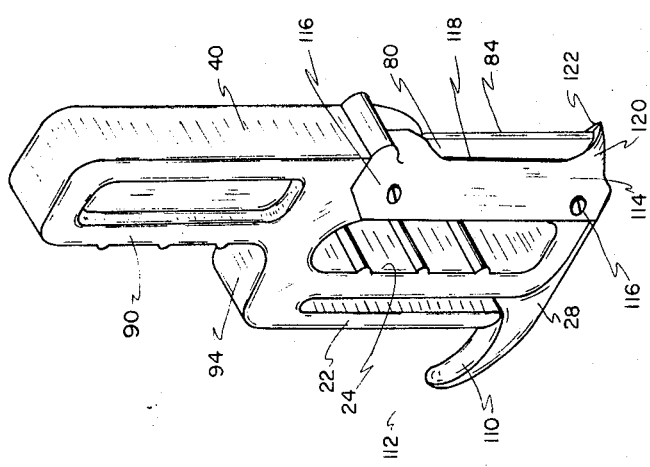
FIG. 3 is a perspective illustration of another presently preferred tool embodiment.

The Embodiment of FIG. 3

The embodiment of FIG. 3 is similar in many respects to the embodiment of FIGS. 1 and 2, like parts having like numerals throughout. In the FIG. 3 embodiment, the body 22 has a rearwardly projecting hook 110 which commences at the lower end 28 of the body 22 and curves upwardly to the rounded tip 112.

Blade 80 is situated within a recess (not shown) in the body 22 and is secured therein by contoured insert 114. Insert 114 is anchored to the body 22 such as with screws 116. The insert 114 has a contoured leading edge 118 which exposes the leading edge 84 of the blade 80 for cutting purposes. Also, if desired, the insert 114 may have a lower lip 120 which is forwardly tapered to a point 122.

A secondary handle 90 is provided to facilitate utility of the tool for cutting with the blade and for use in controlling the position of the hook 110. The handle 90 may also have the configuration of the embodiment of FIG. 2, if desired. Nevertheless, the inclusion of the secondary handle 90 is not essential to the invention and is shown for illustrative purposes only.

The FIG. 3 embodiment of the invention has primary use for gutting fish. The sharpened point 122 can be used to penetrate the anus of the fish and, thereafter, the blade 80 can be drawn or pushed along the length of the belly of the fish to the gills. Hook 110 is used to cut the gill string at the throat of the fish.

The edge 82 of blade 80 is then used to cut away fins adjacent the gill and the point 122 is used to free the fin tissue from the backbone. When the fish has been opened, the hook 110 can be inserted between the gills and the fish entrails removed. The veing existing along the backbone of the fish may be removed in either of two preferred ways depending upon the size of the fish. First, where the fish is small, the end 112 of hook 110 is drawn or pushed along the length of the vein to remove it. Where the fish is larger, it may be necessary to open the membrane of the vein by forcing the hook 122 into the membrane and cutting same from the gill to the anus. Then hook 110 can be used to strip out the blood.

The Embodiment of FIGS. 4–6

Reference is now made to the embodiment of FIGS. 4–6, like parts having like numerals throughout. Referring particularly to FIG. 4, a cutlery tool generally designated 150 has a contoured essentially oval-shaped body 152 having a handhold 154 therein. If desired, the handhold 154 may have a plurality of spaced ribs 156 to facilitate gripping of the body 152. The leading edge 158 of the body 152 merges into a recess 160 formed in the body 152. The recess 160 is obliquely oriented with respect to the handhold 156 and is provided with retainers 162 and 164 for holding a blade 168. Blade 168 may be of any suitable type, for example, a single-edge razor blade.

The lower end 170 of the body 152 is continuous with a forwardly projecting tongue 174. Tongue 174 with the leading edge 158 of body 152 forms a generally V-shaped configuration with the cutting blade 168 situated near the bifurcation point. As can best be appreciated by reference to FIG. 6, the tongue 174 is laterally enlarged and tapered forwardly to a leading tip 176. The upper surface 178 is rounded while the lower surface 180 is essentially flat.

The cutlery tool embodiment of FIGS. 4–6 is used in a way substantially similar to that described for the tool of FIGS. 1 and 2. The use of the tool differs only in that one hand rather than two can be used to disembowel the animal carcass. It should be observed that the blade 168, like the blade 80 of FIG. 1, is situated at an angle with respect to the normal direction of travel of the cutlery tool. For example, in normal use the tool 150 will be moved in a direction from left to right as shown in the Figure essentially parallel with the upper surface of the tongue 174. Thus, the blade 168 will engage the hide at an angle so as to make cutting more facile and effective.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A cutlery tool comprising a body having front and rear and bottom edges and an opening between the front and rear edges to form a handhold; a rearwardly extending member curving in the plane of the tool body and extending angularly with respect to the longitudinal axis of the blade and the tool body; a blade secured to the front edge of the body and having an exposed sharpened surface in substantial alignment with the plane containing the tool body; and a secondary handhold projecting upwardly therefrom essentially parallel to the sharpened surface of the blade.

2. A cutlery tool as defined in claim 1 wherein said secondary handhold is integral with the top surface of the body.

3. A cutlery tool as defined in claim 1 wherein said body has a lateral projection comprising a forwardly tapering tongue situated below the blade and extending angularly with respect to both the blade and the longitudinal axis of the tool body.

4. A cutlery tool as defined in claim 1 wherein said body comprises a recess in the front edge thereof and means for releasably securing the blade in the recess.

5. A cutlery tool as defined in claim 4 wherein said blade is double edged to selectively facilitate rotation of the blade to present a new edge.

6. A cutlery tool as defined in claim 1 wherein said tool body is formed of one-piece molded synthetic resin.

* * * * *